United States Patent [19]

Pirzadeh

[11] Patent Number: 5,771,131
[45] Date of Patent: Jun. 23, 1998

[54] TRACKING IN HARD DISK DRIVE USING MAGNETORESISTIVE HEADS

[75] Inventor: Sean Pirzadeh, Menlo Park, Calif.

[73] Assignee: Quantum Corporation, Milpitas, Calif.

[21] Appl. No.: 683,830

[22] Filed: Jul. 18, 1996

[51] Int. Cl.[6] ................................................. G11B 5/596
[52] U.S. Cl. .......................................................... 360/77.08
[58] Field of Search ........................... 360/77.08, 77.07, 360/77.02, 77.05, 77.11, 78.14, 135

[56] References Cited

U.S. PATENT DOCUMENTS

| | | | |
|---|---|---|---|
| 4,669,004 | 5/1987 | Moon et al. | 360/77 |
| 4,802,033 | 1/1989 | Chi | 360/77.04 |
| 5,138,511 | 8/1992 | Hoshima et al. | 360/77.08 |
| 5,170,299 | 12/1992 | Moon | 360/77.08 |
| 5,193,034 | 3/1993 | Tsuyoshi et al. | 360/77.08 |
| 5,235,478 | 8/1993 | Hoshimi et al. | 360/77.08 |
| 5,257,149 | 10/1993 | Meyer | 360/78.14 |
| 5,268,803 | 12/1993 | Sugita et al. | 360/77.08 |
| 5,369,535 | 11/1994 | Hetzler | 360/78.14 |

*Primary Examiner*—Nabil Hindi
*Attorney, Agent, or Firm*—David B. Harrison

[57] ABSTRACT

An asymmetric quadrature-providing servo burst format for a tracking servo within a hard disk drive is particularly well suited for MR heads. The four-burst format may be written onto the disk with only two servo-writer passes per track by using an alternating one-third, two-thirds track pitch regimen. During operation of a drive incorporating the servo format of the present invention, the servo system uses an appropriate combination of bursts and burst sums, based on burst amplitude profiles, in order to achieve optimized position error signal (PES) continuity and linearity as the head moves off of nominal track centerline of each concentric data track.

21 Claims, 7 Drawing Sheets

*FIG.—1*

TRACKING IN HARD DISK DRIVE USING MAGNETORESISTIVE HEADS

FIELD OF THE INVENTION

The present invention relates to embedded servo patterns for disk drives. More particularly, the present invention provides a method and apparatus for efficiently defining a servo burst pattern and for decoding and using servo burst pattern information for head positioning in disk drives having write-wide, read-narrow heads, such as inductive write element/magnetoresistive read element (MR) heads.

BACKGROUND OF THE INVENTION

Magnetic hard disk drives typically store user data blocks in data sectors arranged within concentric data tracks. The sectors typically include the user data and also include certain overhead information needed by the hard disk drive for head positioning and for locating user data within each data track. The overhead information is typically included within a servo region or sector header located ahead of each user data portion or sector. The servo sector may be recorded at the same frequency as the data sector, or the servo sector may be recorded at one data rate over the entire radial extent of the data storage surface. The user data sectors are typically recorded at data rates based on track radius which enables user data rates to be optimized at the particular radius. Radial zones of adjacent data tracks are frequently employed as a practical compromise between optimum data transfer rate and implementation complexity. It is desirable to minimize the amount of servo information in order to minimize the overhead regions in relation to the user data regions.

The servo information may include information for adjustment of read channel gain elements and block framing elements. The servo information may also include a track number field which is Gray-coded and used for coarse positioning during track seeking and settling operations, a sector number field for circumferential location information within the track. The servo information also typically includes track centering information, such as a plurality of radially and circumferentially offset bursts providing track centerline and quadrature reference information.

While increasing data transfer rate provides one avenue to increase data storage capacity, increased data transfer rate requires one or more of improved media, improved heads, lower relative flying heights, etc. Another way to increase data storage capacity is to employ narrower and narrower tracks and thereby increase the track density on the data storage surface.

Many of the new disk drive systems with high track densities employ a head with a magneto-resistive (MR) read element formed in or over a thin film inductive write element. By using magneto-resistive sensing, a greater electrical output signal is achieved for a given flux change intensity from the recording surface. While MR readers provide greater sensitivity, they also typically operate non-linearly with response to absolute position over the flux transition. This non-linearity means that the MR read element may put out one signal level at a given off-track position in one radial direction of the storage disk, and another signal level at the same given off-track position in the opposite radial direction.

The read/write element separation in MR heads requires new off-track performance requirements in a disk drive. Furthermore, the MR read element is typically significantly narrower than the inductive write element in order to achieve improved signal-to-noise ratio, for example. A narrow MR read element poses PES continuity and linearity problems for the servo system. Some existing solutions have addressed this issue by requiring a servo-writing procedure which requires as few as three servo-writer passes per data track, thereby reducing somewhat the manufacturing costs associated with servowriter process times. Other solutions have focused more on different ways of decoding the positioning information. What has been lacking in the prior approach has been a servo writing method which requires at most two passes per track of the servo writer and which writes a servo burst pattern which offers the potential of providing even better position continuity and linearity. Another heretofore unsolved need has been for a disk drive servo which uses a new servo burst format to achieve improved head tracking continuity and linearity.

SUMMARY OF THE INVENTION WITH OBJECTS

A general object of the present invention is to provide an improved servo tracking burst pattern for a hard disk drive which may be written in two passes per track and which provides improved continuity and linearity for MR read elements in a manner overcoming limitations and drawbacks of prior approaches.

The present invention is a quadrature-providing servo burst format for a tracking servo within a hard disk drive which is particularly well suited for MR heads. The format may be written onto the disk with only two servo-writer passes per track, as opposed to other commonly employed patterns and methods requiring three or more passes per track. During operation of a drive incorporating the servo format of the present invention, the servo system selects and uses an appropriate combination of bursts, based on burst amplitude profiles, in order to achieve optimized position error signal (PES) continuity and linearity as the head moves radially relative to a nominal track centerline.

These and other objects, advantages, aspects and features of the present invention will be more fully understood and appreciated by those skilled in the art upon consideration of the following detailed description of a preferred embodiment, presented in conjunction with the accompanying drawings.

DETAILED DESCRIPTION OF PREFERRED EMBODIMENTS

Figure 1:
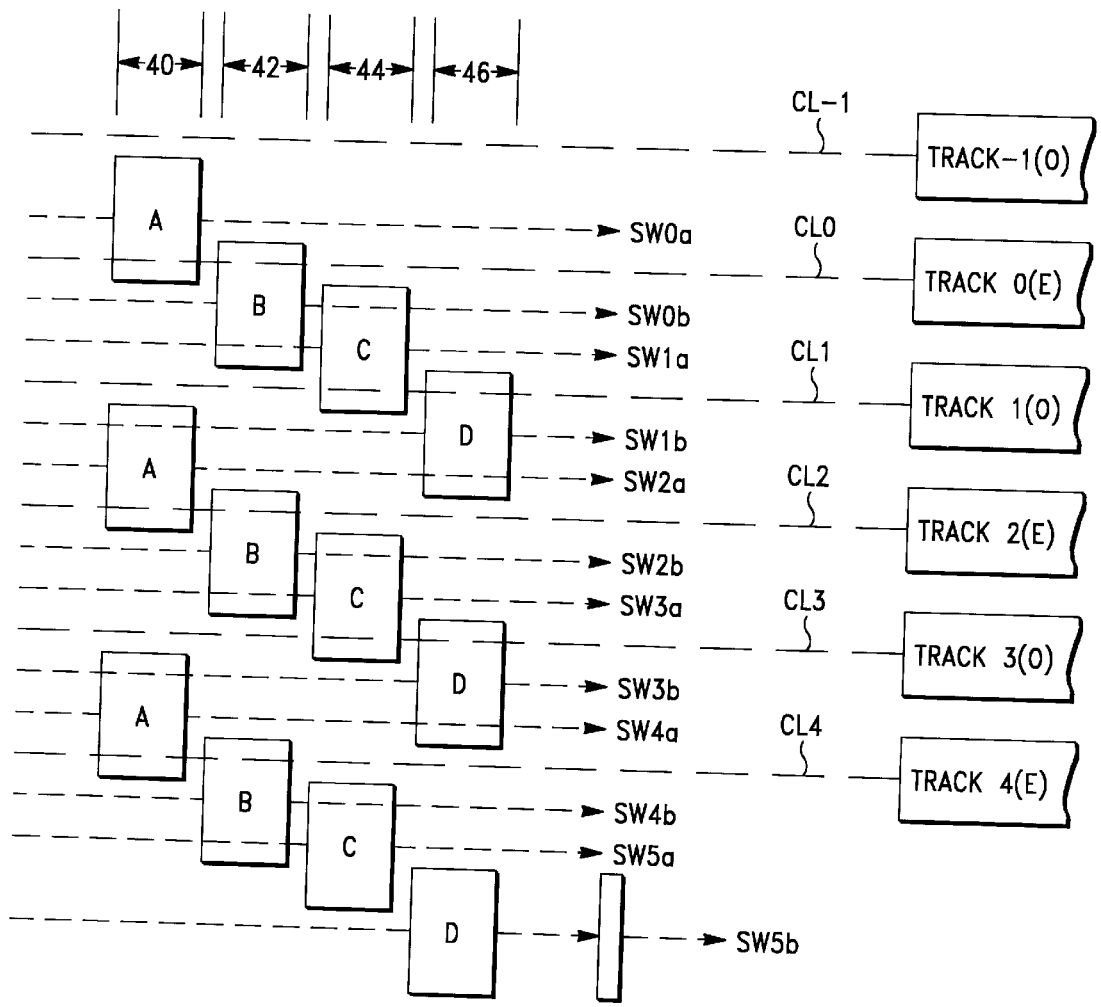
FIG. 1 is an enlarged plan view of an exemplary portion of a servo sector burst pattern arranged and servo-written in accordance with principles of the present invention.

With reference to FIG. 1, a servo burst pattern is recorded in two passes per data track in accordance with principles of the present invention. The servo burst pattern includes four time-sequential bursts: an A burst, a B burst, a C burst and a D burst. As shown in FIG. 1 the bursts are not only time-sequential (i.e. circumferentially spaced and read by a read element of a head structure 10), the A, B, C and D bursts are also radially offset relative to data track nominal centerlines CL. Due to narrow reader element gap widths, MR read heads generally produce a nonlinear position error signal (PES) profile when reading a standard 2-pass quadrature-burst pattern format. A disk drive 20 (see FIG. 3) in accordance with principles of the present invention uses the FIG. 1 pattern in order to achieve reasonable PES off-track linearity, and the new pattern can still be servo written in two passes per track. Improved linearity is achieved because the burst profile depends upon the read width/write width ratio instead of a read width/track width ratio, leading to less saturation of the burst amplitudes.

A, B, C and D bursts are written in two passes per data track, with servo writer head positioning alternating between ⅔ and ⅓ track pitch steps. The A, B, C and D bursts are not trimmed during servo writing, thereby avoiding nonlinearities associated with trimming due to gap length and write element throat height. Fine position head tracking information is decoded by using A–B phase when the head is adjacent to even track centerlines, and by using the C–D phase when the head is adjacent to odd track centerlines. With reference to even track center, the B–C phase is used around the +50% off-track offset position, and A–D phase is used around the −50% off-track head position. Two calibrated slopes are used, one for A–B and C–D phases, and the other for B–C and A–D phases.

Figure 3:
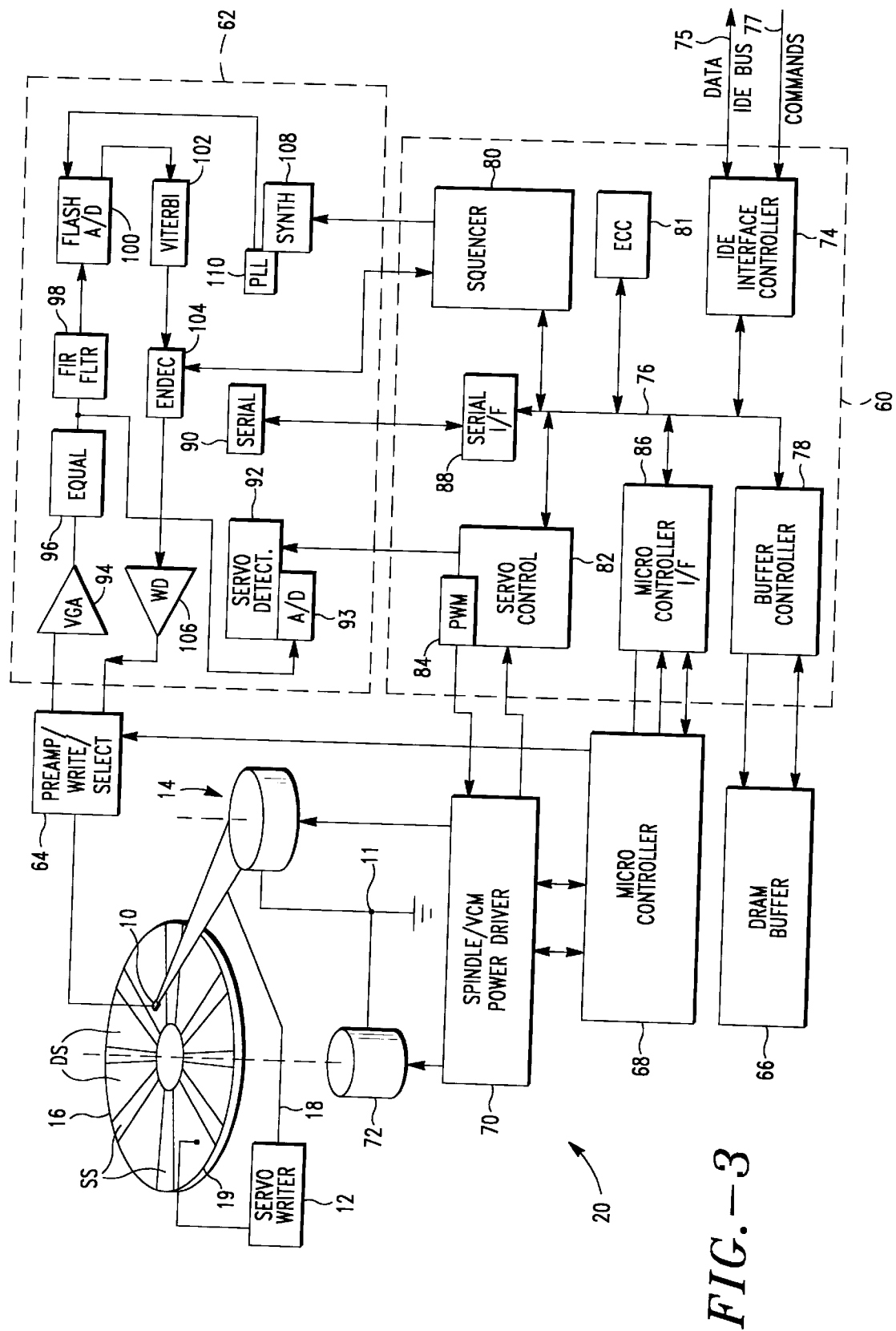
FIG. 3 is a block diagram of a hard disk drive having a storage disk servo-written with the FIGS. 1 and 2 servo patterns.

During a servo-writing operation which is part of the disk drive manufacturing process, a servo-writer 12 (shown diagrammatically in FIG. 3) is used to engage and control radial position of a rotary actuator assembly 14 relative to a disk 16 of a hard disk drive 20. A push-pin 18 of the servo-writer 12 may engage a head arm of the actuator assembly 14, and thereby precisely position the head 10 including a write element at each radial burst servo-writing location. A servo-writer clock, which may be established by writing and then reading a clock track on the disk 16 with a separate clock head 19 associated with the servo-writer 12, enables a precise writing time window to be established for each burst field during disk rotation. As shown in FIG. 3, the data surface of the disk 16 is divided into a plurality of data sectors DS by embedded servo sectors SS. While only a few servo sectors SS are shown in FIG. 3, in practice more servo sectors are used, for example 112 servo sectors SS per one complete revolution of the disk 16. One of the servo sectors is uniquely designated as an index sector, which marks a fiducial location on the circumference of the disk 16 as track beginning (and ending).

In FIG. 1 nominal centerlines of servo writing paths SW are marked by short dashed lines, whereas nominal centerlines of data track paths CL are marked by long dashed lines. Within each nominal data track width, the servo writing paths SW are spaced at a track pitch of two-thirds. Between adjacent data tracks, the servo writing paths SW are spaced at a track pitch of one-third. The electrical width of the writing element of the head 10 is in the present example approximately 90% of a full track pitch, thereby leaving a separation or guard band between each data track of about 10% of the track pitch.

It will be observed by inspection of FIG. 1 that none of the burst edges are aligned with a data track centerline CL. That is to say, for data track 0, the A burst edge and the B burst edge associated with the A burst edge overlap each other by approximately 25% of a track width and lie on opposite sides of the data track 0 centerline, whereas the C burst edge and the D burst edge associated with the B burst edge overlap each other by approximately 25% of a track width and lie on opposite sides of the data track 1 centerline.

Figure 2:
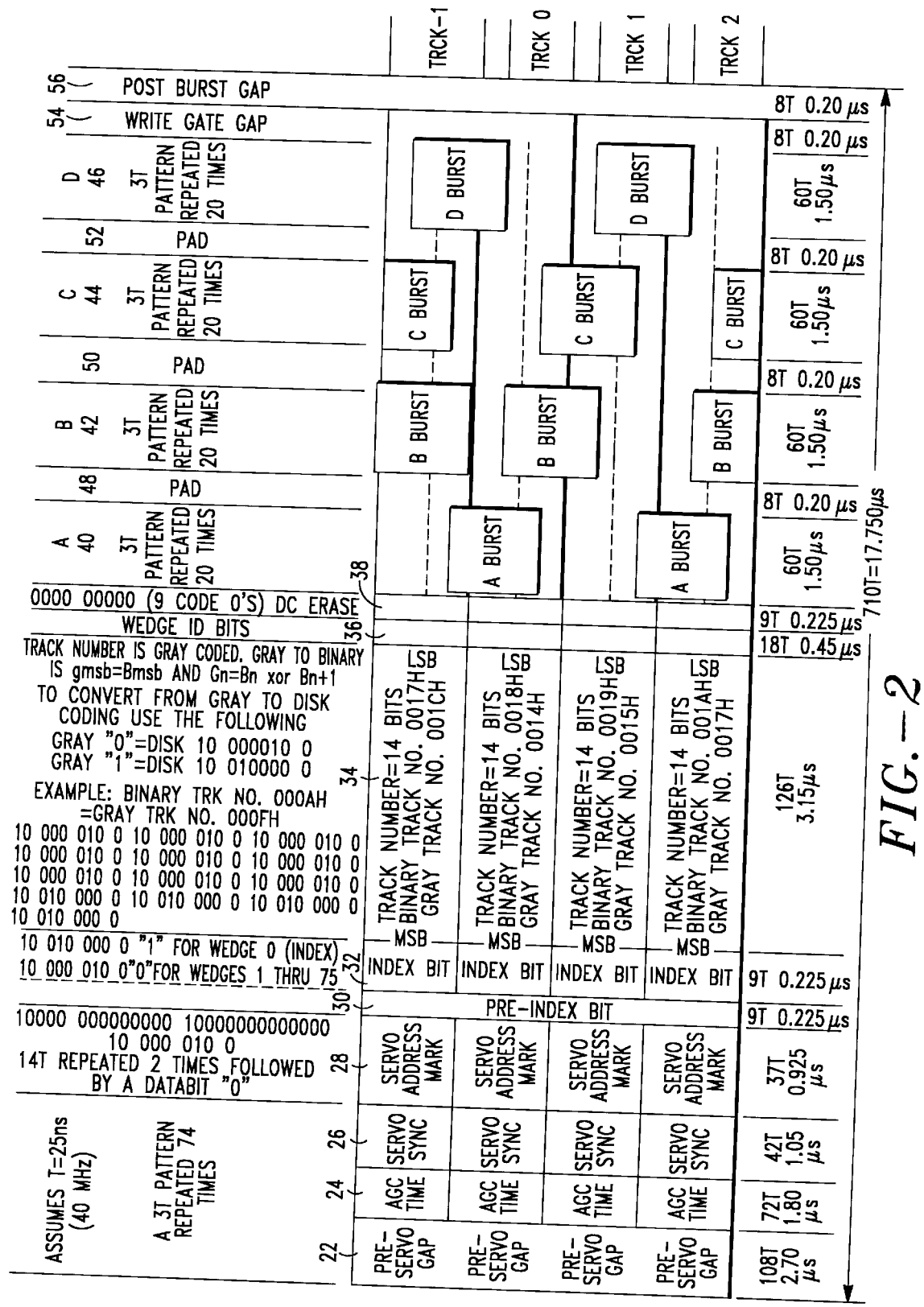
FIG. 2 is another enlarged plan view of a completed servo sector pattern for four adjacent data track locations, showing the servo burst pattern in accordance with principles of the present invention.

During a servo-writing operation for writing e.g. the first A burst, a write gate is opened during A burst field time 40 and the A burst is written. The write gate remains open during B and C burst field times 42 and 44, and a DC erase operation is carried out. For A burst, write gate is disabled during D burst field time 46. When the B burst is written, write gate is disabled during A burst field time 40 so as not to overwrite the previously written A burst. The B burst is written, and write gate remains enabled during C burst field times 44 and 46 when a DC erase operation is carried out. When the C burst is written, write gate is enabled during A burst field time 40 and a DC erase operation is carried out. Write gate is disabled during B burst field time 42, and enabled to write the C burst, and remains enabled to DC erase during the D burst field time 46. When the D burst is written, write gate is enabled for DC erase during A and B burst fields times 40 and 42 and disabled during C burst field time 44, and reenabled when the D burst pattern is written. Each burst pattern A, B, C and D is preferably written as a 3T data pattern repeated e.g. 20 times, wherein T equals 25 nanoseconds and represents a 40 MHz servo clock cell rate in the present example. As shown in FIGS. 1 and 2, short duration (8T) guard band fields 48, 50 and 52 respectively separate the A, B, C and D burst fields 40, 42, 44 and 46.

After the A, B, C and D servo bursts are written at a servo-writing step, data tracks may be defined at locations and along center lines as shown in FIG. 1. In this example the effective electrical width of the thin film write element of the head 10 is about 90% of the nominal track width. With a preferred track density of 6775 tracks per inch (TPI), the electrical width of the write element is nominally 3.5 mm, with a physical gap width of 3.0 mm. The magneto-resistive read element of the head 10 preferably has a width of 2.4 mm.

FIG. 2 shows an exemplary servo sector pattern SS recorded at a constant T cell rate and extending radially over several adjacent data tracks. The nominal servo pattern essentially comprises a pre-servo gap 22 of 108T cells duration, an AGC field 24 of 72T cells duration, a servo synchronization field 26 of 42T cells duration, a servo address mark field 28 of 37T cells duration, a DC erase pre-index bit 30 of 9T cells duration, an index bit 32 of 9T cells duration, a Gray coded track number field 34 of 126T cells duration, a servo sector ("wedge") identification field 36 of 18T cells duration, and a DC erased buffer field 38 of 9T cells duration preceding the burst fields for the A, B, C and D bursts, already explained in connection with FIG. 1.

The servo fields 22–39 may be self-written by the drive 20 during disk drive self-scan procedures following servo-writing with the servo-writer 12. In this manner, the disk drive 20 is able to complete the servo field information, and properly locate it within data track locations, based upon the A, B, C, and D, servo burst information written in fields 40, 42, 44 and 46, respectively.

FIG. 3 provides further electrical details concerning the hard disk drive 20. As shown in FIG. 3, the voice coil actuator assembly 14 and a spindle motor 72 are mounted to a disk drive base plate or housing 11. A cover (not shown) encloses the head 10, and the disk 16 in order to minimize adverse influence of particulate contaminants which are typically purged within so-called "flying head" or Winchester hard disk technology. Structural details of the base plate are not pertinent to an appreciation of the present invention and are not presented. While only one head 10 and one disk 16 are shown in FIG. 3, those skilled in the art will appreciate that each data storage surface would typically have a separate head, and that multiple disks may be mounted onto a common spindle and rotated in unison by the spindle motor 72. All heads would be moved in unison by the rotary voice coil actuator structure 14.

Preferably, the drive 20 includes six integrated circuits, at most: a disk drive controller ASIC 60, an analog/digital mixed signal read and write channel chip 62, a read preamplifier/write selector chip 64 located as close as practical to the head structure 10 to minimize noise, a data and firmware DRAM buffer 66, a microcontroller 68, and a digital/analog mixed signal motor driver power chip 70. The driver chip 70 provides operating power to a voice coil motor of the actuator 14, and provides driving currents to a disk spindle motor 72 for rotating the disk 16 at a predetermined constant angular velocity, e.g. 3600 RPM.

The drive controller ASIC 60 includes an interface section 74 providing an interface data bus 75 and command bus 77 connections to a host computing environment. In the illustrated example, an IDE bus interface structure is contemplated. An internal bus structure 76 within the drive controller ASIC 60 carries both commands and data from the interface controller 74 to other circuit functions within the ASIC 60. Those functions include a buffer controller 78 for controlling and refreshing the DRAM buffer 66. A sequencer 80 is included for controlling the sequencing of data blocks to and from the write/read channel chip 62, and a dedicated ECC function 81 provides error correction code protection to each of the data blocks sent to and received from the disk 16 via the write/read channel 62 and preamplifier circuit 64.

A servo controller 82 receives and decodes the servo fields 22–56 from each servo sector SS, except for the burst amplitude values. The servo controller 82 reports servo status to the microcontroller 68 when errors in a servo sector SS are detected. Errors include e.g. missing sync patterns, missing servo address marks, errors reading the Gray coded track number field 34, and spindle speed errors (i.e. SAMs are detected outside of a ±0.25% speed tolerance window). When a missing sync pattern or SAM pattern condition is encountered, the servo controller 82 sets its timer to a known value. This procedure is invoked to compensate for elapsed time lost while looking for the missing SAM. This way, the A,B,C and D burst fields 40, 42, 44 and 46 may continue to be sampled and the end of the servo sector SS will still be marked. One example of a servo controller 82 is described in commonly assigned U.S. Pat. No. 5,420,730 to Moon et al., entitled: "Servo Data Recovery Circuit for Disk Drive Having Digital Embedded Sector Servo", the disclosure thereof being incorporated herein by reference.

A pulse width modulator 84 provides a command current driving control signal to the spindle motor/voice coil motor driver chip 70 for controlling positioning of the voice coil actuator 14. The current driving control signal preferably comprises a six-bit plus five-bit pulse width modulation with four-times oversampling. These values are summed within the motor driver chip 70 to provide 13 bits to control the magnitude of the voice coil motor coil current. These values are subsequently low pass filtered to produce an analog current command signal. The PWM value received at the modulator 84 is computed by and sent from the microcontroller 68 under direction of servo control loop firmware.

A micro-controller interface 86 enables the microcontroller 68 to receive its instructions from the DRAM buffer and to execute commands and control disk drive functions. A serial interface 88 enables the drive controller ASIC 60 to pass commands to the write/read channel chip 62, via a serial interface circuit 90 in that chip.

The mixed-mode write/read channel chip 62 also includes a servo burst amplitude peak detector circuit 92 which sequentially samples and holds analog burst peak amplitude values read from the A, B, C and D bursts by the read element of the head 10. The peak detector circuit 92 is preferably implemented as a rate-controlled charge only peak detector for extracting the peak amplitudes of the A, B, C and D bursts read from each servo sector SS. The detector 92 has two operating modes: fast charging used during initial charging, and slow charging used during final settling to peak value for each burst. During all modes of operation, the A, C or B, D bursts are used. The gate inputs to the peak detector 92 and the control of which bursts are sampled, are sent from the servo controller 82. The timing of the gate inputs (i.e. delay to start, and sampling duration) is programmable. An e.g. eight-bit servo analog-to-digital converter 93 receives sampled and held burst amplitude values and converts them into digital values for processing by the servo control loop during track following operations. The digitized burst peak values are sent over the serial data path from the write/read channel chip 62, through the serial interface 88 of the disk drive controller ASIC 60, and through the microcontroller interface 86 to the microcontroller 68. The servo control loop firmware executed by the microcontroller 68 is used to determine actual head position, estimate a desired head position, and correct actual head position to the estimated position.

Signals from the disk 16 are read by the MR read element of the head 10, preamplified by the preamplifier function within the preamp/write selector chip 64 and sent to a variable gain amplifier (VGA) 94. During servo time, gain of the VGA 94 is set with reference to reading of the AGC field 24. A programmable analog equalizer 96 enables a readback function to be equalized to a predetermined partial response signaling channel, such as Partial Response, Class 4 (PR4) during data readback, and to the servo bandwidth during servo readback intervals. Also, an analog adaptive finite impulse response filter 98 is used to equalize the data signals to the predetermined data channel conditions. A flash analog to digital converter 100 converts data samples into digital values. These digital values are then fed into a maximum likelihood detector, such as a Viterbi detector 102, which selects and puts out most likely coded data values in accordance with predetermined coding constraints within the partial response scheme being employed. Preferably, the code is a rate 16/17 (D=0,G=6/I=7) modulation code, and may be the code described in commonly assigned, copending U.S. patent application Ser. No. 08/497,182, filed on Jun. 30, 1995, the disclosure thereof being incorporated herein by reference. An encoder/decoder 104 decodes coded values received from the Viterbi detector 102 during reading operations, and encodes data values received from the sequencer 80 during writing operations. A write driver 106 generates write driving currents and selectively applies the driving currents through the head select chip 64 to energize an inductive writing element of a selected head 10 (only one head 10 shown in FIG. 3).

There are three servo modes of operation of the disk drive 10. A fast seek mode is used to move the read/write head 10 from one concentric track radial position to another, relatively distant radial track location in a minimum time interval. In order to perform efficient seeking operations, the fast seek mode has five sub-modes: acceleration, coasting, deceleration, linear velocity control, and linear velocity with low bandwidth. Fast seek mode is based on velocity control. Since the fast seek mode does not rely on servo bursts for control information, it will not be discussed in any greater detail. The second mode is the track settling mode. This mode is used for single-track seeks, head switches, and final approach to track center on longer seeks. It uses position control rather than velocity control, and therefore it relies upon the burst amplitude position information provided by the A, B, C and D bursts. Track settling mode is very similar to the FIG. 4 servo on-track mode.

Figure 4:
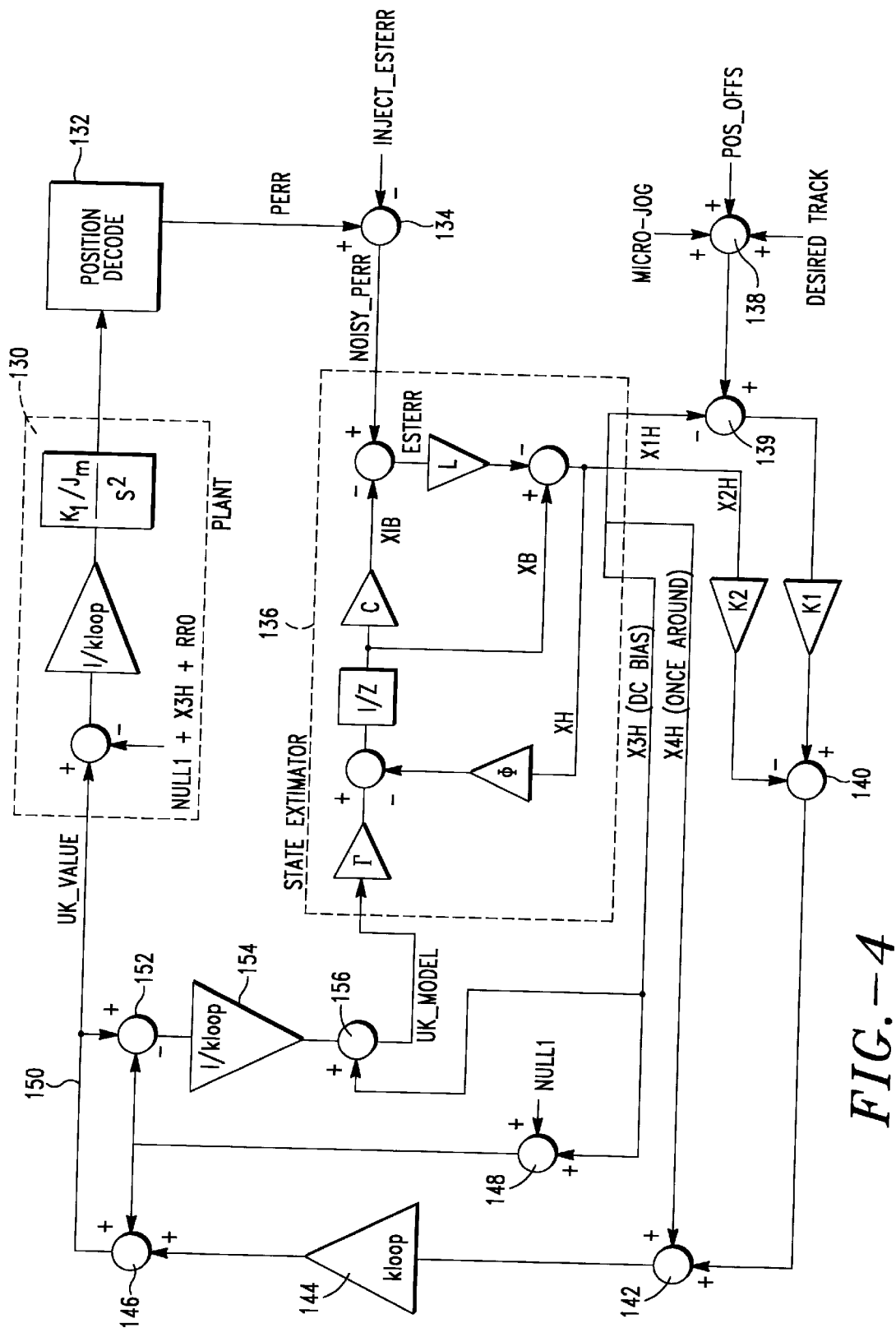
FIG. 4 is a functional block diagram of a servo loop within the FIG. 3 hard disk drive which operates during track following.

FIG. 4 sets forth a functional diagram of the third mode, i.e., servo on-track mode. In this mode, which is designed to require minimized microcontroller processing bandwidth to less than 50% in order to minimize command overhead, the A, B, C and D servo burst patterns enable identification of exact head position anywhere on the usable data storage surface of the disk 16. Track center is defined as the radial point at which the A burst amplitude equals the B burst amplitude for even data tracks, and at which the C burst amplitude equals the D burst amplitude for odd data tracks. Absolute servo position is obtained from the servo burst information in combination with the Gray coded track number information in the track identification field 34.

Track following mode employs a state estimator 136, with coefficients selected for good actuator DC stiffness and adequate stability. Either the A–B, C–D,, B–C or A–D burst phases are used, depending upon whether the head is adjacent a track centerline or is offset from track centerline. The use of the four burst pattern described herein enables fine positioning at any radial point on the surface of the disk 16.

With reference to the FIG. 4 servo diagram, the disk drive 16 is modeled as a plant 130 which receives actuator current command values on a path 150 and puts out position signals to a position decode function 132 which puts out position error values. An injected estimated error is subtracted from the position error at a summing junction 134 and results in a noisy position error which is supplied to the state estimator 136. Another summing junction 138 combines a position offset value, a desired track value, and a microjog value to produce a desired position value. The micro-jog reference is set for a given head and radial data zone. Micro jogging is used for read operations because the MR read element of the head 10 must be positioned to be co-linear with the track written to the disk by the thin film write element of the head 10. This micro-jog distance is calibrated during the manufacturing process and is referenced by virtue of a table during read access operations. No micro jogging is needed during data writing operations.

A summing junction 139 subtracts an estimated position value put out by the state estimator 136 from the desired position value put out by the summing junction 138 to produce a refined position value. A velocity component is subtracted from the refined position value at a summing junction 140. A summing junction 142 combines an estimated repeatable runout error correction value with the velocity-excluded refined position value. The repeatable runout error correction value is derived from a control feed forward profile to enable the servo to better track disk shift and head tilt. A gain function 144 then applies a servo loop gain function to the position value before passing it on to another summing junction 146. The summing junction 146 combines the loop gain normalized position value with a value from a summing junction 148 which adds a DC bias estimate value to a null current (NULLI) value. The summing junction 146 puts out the actuator current command value on the path 150 to the disk drive plant 130.

Figure 5:
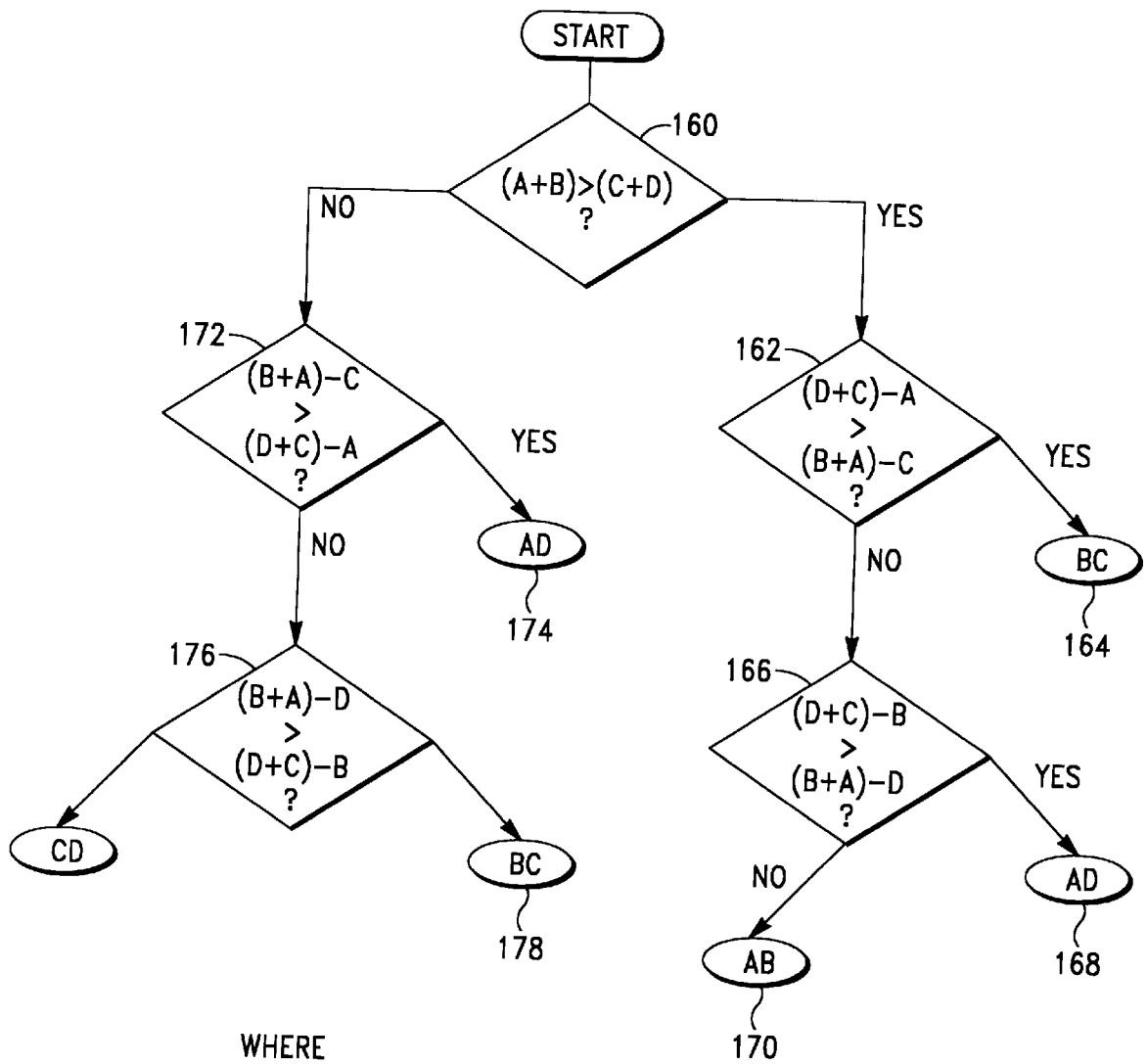
FIG. 5 is a decision tree logic diagram for selecting burst pair amplitude values to be used during track following operations by the FIG. 4 servo loop (for a four-phase head position decoding scheme).

FIG. 5 sets forth a real-time decision tree which may be followed by the servo firmware executed by the microcontroller 68 in deciding which burst pair to use in determining head position. When employed, a path along the FIG. 5 decision tree is followed at each servo sample time during track following operations of the FIG. 4 servo loop. Advantageously, the FIG. 5 decision tree approach does not impose fixed switch points, and implements burst phase switching based on read/write head width ratios which may vary slightly within acceptable tolerances from head to head. Nominally, a desirable read/write head width ratio provides for a linear control slope over ±33% about track centerline. If, for example, a disk drive specification calls for a ±30% micro-jog range, and nominal tracking linearly over ±33% of a track centered at track centerline, then for most disk drives within the specification, burst phase switching can be avoided during tracking operations, whether reading or writing. It is desirable to avoid burst phase switching when possible.

Returning to FIG. 5, parentheses are placed around terms in the decision tree that need be calculated only one time during each servo sector sampling interval. A first logical step 160 determines whether the burst amplitude sum A+B is greater than the burst amplitude sum C+D. If so, a second logical step 162 determines if the burst amplitude function (D+C)–A is greater than the burst amplitude function (B+A)–C. If so, the BC burst pair is selected at a step 164 and used. If not, a third logical step 166 determines if the burst amplitude function (D+C)–B is greater than the function (B+A)–D. If so, the AD burst pair is selected at a step 168, and if not, the AB burst pair is selected at a step 170.

Returning to the initial logical step 160, if the burst amplitude sum A+B is not larger than the burst amplitude function C+D, a fourth logical step 172 is reached. This step determines if the burst amplitude function (B+A)–C is greater than the function (D+C)–A. If so, burst pair AD is selected at a step 174. If not, a fifth logical step 176 is reached which determines whether a burst amplitude function (B+A)–D is greater than the function (D+C)–B. If so, the burst pair BC is selected at a step 178, and if not, the burst pair CD is selected at a step 180. In following the FIG. 5 four-phase decision tree process, those skilled in the art will appreciate that the AB phase is equivalent to B–A, the CD phase is equivalent to D–C, the BC phase is equivalent to C–B, and the AD phase is equivalent to A–D.

Figure 6:
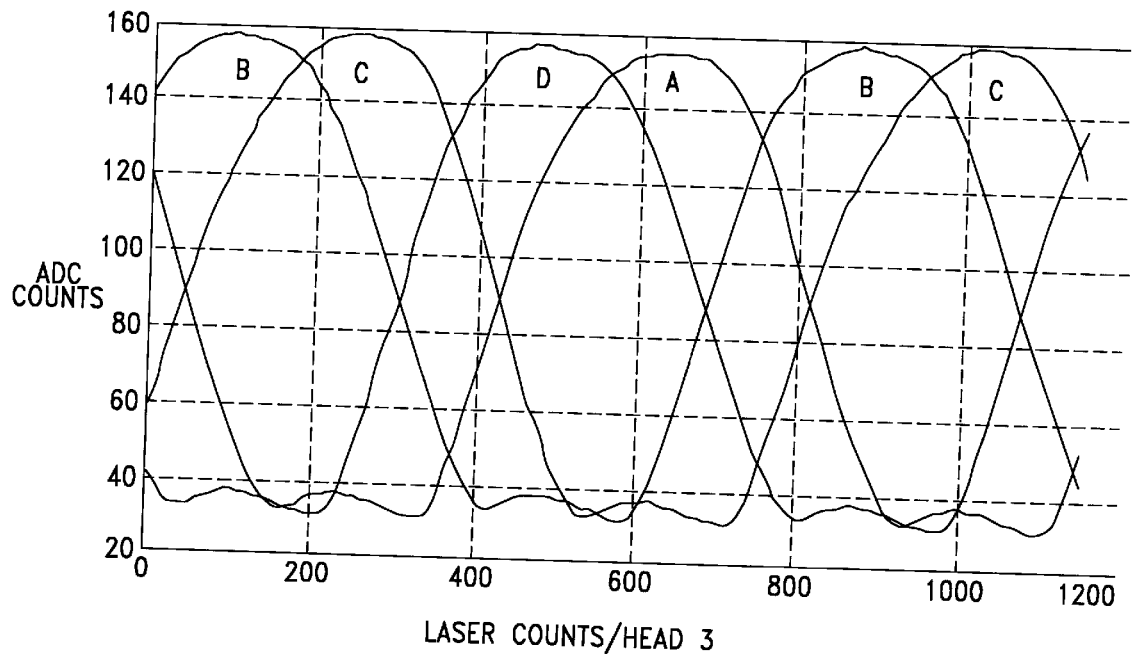
FIG. 6 is a graph of servo burst amplitude measured in ADC counts as a function of radial displacement of the head, measured in servo-writer laser radial-position counts.
Figure 7:
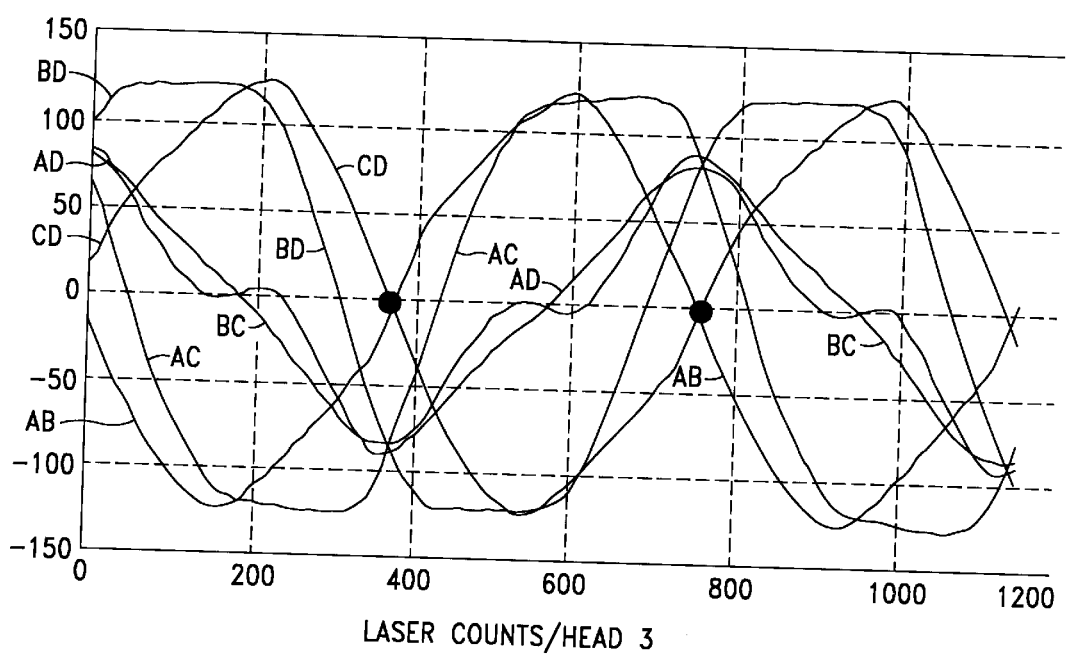
FIG. 7 is a graph of six-phase head position amplitude values as a function of radial displacement of the head, also measured in servo-writer laser counts.

FIG. 6 illustrates B,C,D,A burst edge amplitude values (vertical axis) quantized over several adjacent data tracks (horizontal axis). FIG. 7 graphs six burst sum amplitudes (vertical axis) over several adjacent data tracks (horizontal axis). Substantially linear slopes are realized from the AB, AC, BC, BD, CD, AC and AD burst amplitude differences. The particular burst pair phase may be selected dynamically in accordance with the decision tree flowchart set forth as FIG. 5, or a fixed switch point strategy may be employed.

Figure 8:
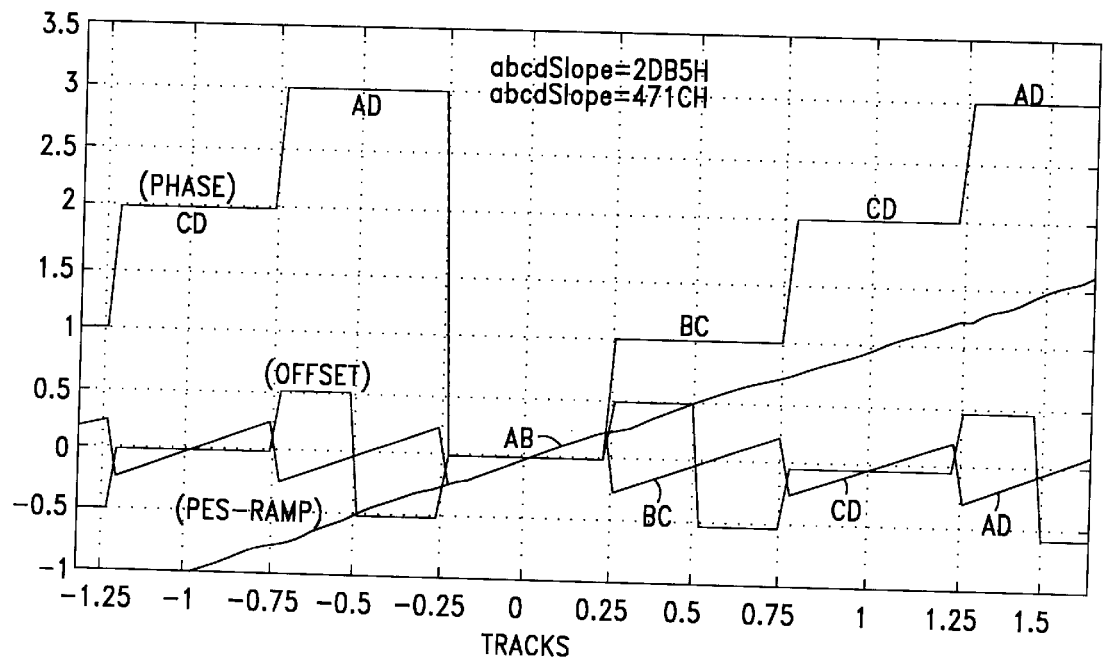
FIG. 8 is a graph of four-phase head position detection using the servo pattern of the present invention with an MR read element.

FIG. 8 illustrates a four-phase position detection arrangement using A–B, B–C, C–D and A–D differences with fixed phase switch points. By combining a predetermined offset amplitude value with the burst pair amplitude difference sensed by the head within each phase (relative amplitude is graphed on the vertical axis), a substantially linear position slope is produced in relation to head-track position (graphed on the horizontal axis).

Figure 9:
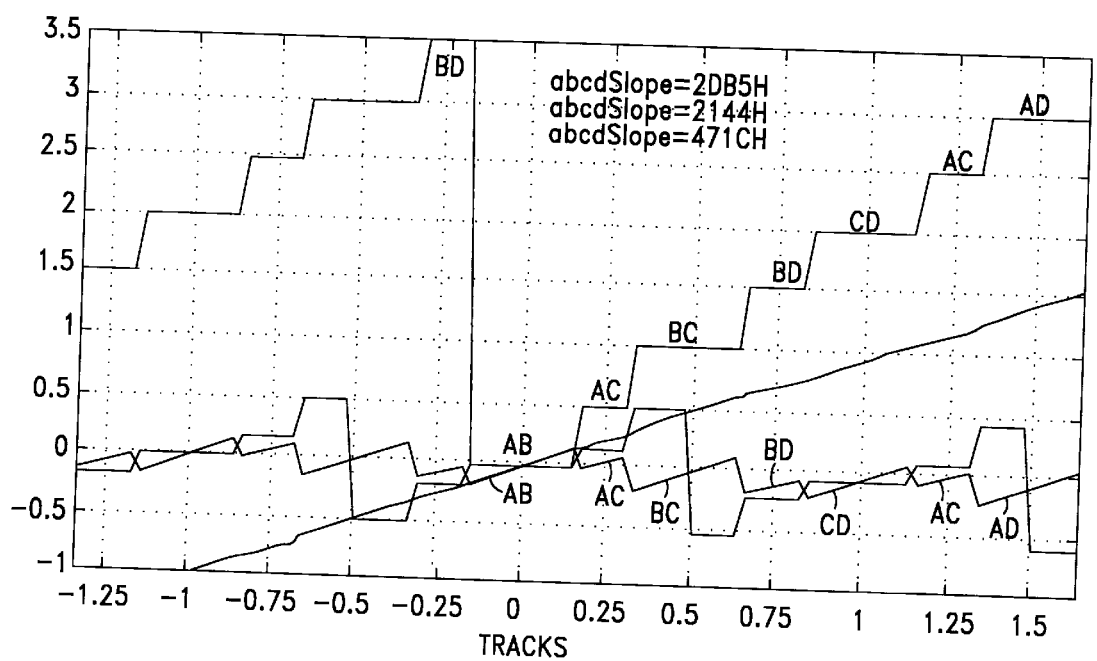
FIG. 9 is a graph of six-phase head position detection using the servo pattern of the present invention with an MR read element.

More precise position information may be obtained by using the six-phase position detection arrangement graphed in FIG. 9. In this graph amplitude differences and fixed offset values for six burst phases, A–B, A–C, B–C, B–D, C–D, A–C and A–D, are used to establish head position as a function of radial offset from e.g. track 0 to track 1. Horizontal line segments superimposed with PES slope increments in FIGS. 8 and 9 represent fixed offset values, each of which is associated with the selected PES burst phase. The offset value for a PES burst phase is put into the servo loop at the summing junction 138 (shown in FIG. 4) when the increment is selected. Fixed phase switch points are used in the six-phase approach.

Whether the FIG. 8 four-phase servo process, or the FIG. 9 six-phase servo process, is used depends upon the effective read head width to write head width ratio. If the read head width is significantly narrower than the write head width, the six-phase servo process of FIG. 9 will be preferred. However, for read head widths which are less narrow relative to write head width, the FIG. 8 four-phase process is preferred. FIG. 8 nominally provides ±25% track pitch servo offset control with the A–B burst phase about the centerline of track 0, whereas FIG. 9 nominally provides ±12% track pitch servo offset control with the A–B burst phase, suggesting that during track following operations, phase switches will be needed to implement micro-jog.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A method for improved position error signal (PES) continuity in a disk drive including a magnetic data storage disk rotating relative to a base, a data transducer assembly positioned at concentric data tracks having a substantially uniform track pitch by a rotary actuator referenced to the base and controlled by a digital servo system, the data transducer assembly having a narrow magnetoresistive (MR) read element width relative to a write element width, the digital servo system employing quad servo bursts including A, B, C and D bursts radially and circumferentially spaced apart in servo sectors embedded within the data tracks, the method comprising steps of:

during servo writing:
(a) writing the A burst at one-third track pitch while performing a DC erase within time windows for the B and C bursts;
(b) writing the B burst two-thirds track pitch away from the A burst while performing a DC erase within time windows for the C and D bursts;
(c) writing the C burst one-third track pitch away from the B burst;
(d) writing the D burst two-thirds track pitch away from the C burst; and during servo following:
(e) measuring burst amplitudes of the quad servo bursts as the data transducer assembly is passed over each track; and
(f) using selected combinations of the burst amplitudes to obtain a PES profile as the data transducer assembly moves off-track, wherein a quad servo burst pattern is provided in two passes per track, and wherein each DC erase is a complete track away from a corresponding burst written during a previous pass so that the bursts are untrimmed.

2. A magnetic data storage disk having an asymmetric quad servo burst pattern defined within a servo sector embedded within adjacent concentric data tracks for improved position error signal (PES) continuity in a disk drive wherein the magnetic data storage disk is rotating relative to a base, and further including an electromagnetic data transducer for reading the quad servo burst patterns and being part of an assembly positioned at concentric data track locations by a rotary actuator referenced to the base and controlled by a digital servo system responsive to read quad servo burst patterns, the data transducer assembly having a narrow magnetoresistive (MR) read element, each quad servo burst pattern comprising:

(a) a first servo burst having first servo burst edges offset from a centerline of the data track by one-third track pitch;
(b) a second servo burst having second servo burst edges offset two-thirds track pitch from the first servo burst edges;
(c) a third servo burst having third servo burst edges offset one-third track pitch from the second servo burst edges;
(d) a fourth servo burst having fourth servo burst edges offset two-thirds track pitch from the third servo burst edges; and
(e) DC erase gaps corresponding to the first, second, third and fourth servo bursts, each DC erase gap being a complete track away from its corresponding servo burst, wherein the servo bursts are circumferentially adjacent each other on the data track, and wherein configuration of the servo bursts with the DC erase gaps provide an untrimmed burst pattern thereby enabling improved PES continuity of the digital servo system.

3. A method for writing an improved position servo burst pattern onto a magnetic data storage disk rotating relative to a base in two passes per data track with a servo writer, a data transducer assembly positioned at concentric data track locations by a rotary actuator referenced to the base and controlled by a digital servo system and by the servo writer, the data transducer assembly having a narrow magnetoresistive (MR) read element width relative to a write element width, the servo writing method comprising in sequence the steps of:

(a) writing the A burst at one-third track pitch while performing a DC erase within time windows for the B and C bursts;
(b) writing the B burst two-thirds track pitch away from the A burst while performing a DC erase within time windows for the C and D bursts;
(c) writing the C burst one-third track pitch away from the B burst;
(d) writing the D burst two-thirds track pitch away from the C burst; and repeating the foregoing steps (a)–(d) across the disk surface.

4. A hard disk drive comprising:
a base,
a data storage disk rotating relative to the base,
an actuator structure for positioning a data transducer head at radial locations of a data storage surface of the disk,
the disk defining a multiplicity of concentric data tracks,
the disk defining a pattern of servo sectors embedded within the tracks,
a servo sector including a repeating pattern of circumferentially sequential, radially offset servo bursts comprising:
(a) a first servo burst (A) having first servo burst edges offset from a centerline of a data track by a first fractional track pitch dimension;
(b) a second servo burst (B) having second servo burst edges offset by a second fractional track pitch dimension from the first servo burst edges;
(c) a third servo burst (C) having third servo burst edges offset by the first fractional track pitch dimension from the second servo burst edges; and
(d) a fourth servo burst (D) having fourth servo burst edges offset by the second fractional track pitch dimension from the third servo burst edges,
the data transducer head including a write-wide thin film inductive writing element, and a read-narrow magnetoresistive read element, and
the disk drive including a head position servo loop responsive to the read element for determining head position by reading relative amplitudes of the repeating pattern of servo bursts.

5. The hard disk drive set forth in claim 4 wherein the first fractional track pitch dimension is one-third of one nominal track width, and wherein the second fractional track pitch dimension is two-thirds of one nominal track width.

6. The hard disk drive set forth in claim 5 wherein the first servo burst (A) has a burst edge offset from a first data track's centerline by a third fractional track pitch dimension in a first radial direction, and the second servo burst (B) has a burst edge offset from a first data track's centerline by a fourth fractional track pitch dimension in a second radial direction opposite the first radial direction.

7. The hard disk drive set forth in claim 6 wherein the third servo burst (C) has a burst edge offset from a second data track's centerline by the third fractional track pitch dimension and the fourth servo burst has a burst edge offset from the second data track's centerline by the fourth fractional track pitch dimension, and wherein the second data track is adjacent to the first data track.

8. The hard disk drive set forth in claim 7 wherein the absolute value of the third fractional track pitch dimension and the fourth fractional track pitch dimension is approximately one eighth of a nominal track width.

9. The hard disk drive set forth in claim 4 wherein the head position servo loop includes burst phase selection means for determining head position by selecting a pair of servo bursts and for differencing relative amplitudes of the selected pair of servo bursts to obtain a position error signal.

10. The hard disk drive set forth in claim 9 wherein the burst phase selection means selects burst pairs in accordance with a decision tree.

11. The hard disk drive set forth in claim 9 wherein the burst phase selection means selects burst pairs in accordance with predetermined burst phase switch points fixed in relation to radial position of the head relative to a track.

12. The hard disk drive set forth in claim 9 wherein the burst phase selection means selects between four available burst phases in obtaining the position error signal.

13. The hard disk drive set forth in claim 9 wherein the burst phase selection means selects between six available burst phases in obtaining the position error signal.

14. A head position servo for a disk drive including:
a rotating data storage disk having servo burst information embedded within data storage tracks of a rotating data storage disk, the tracks having a substantially uniform track pitch,
a head transducer for reading the servo burst information and being positioned by an actuator structure controlled by the head position servo system, the head transducer having separate read and write elements and wherein a ratio of read element width to write element width is less than unity,
the servo burst information comprising:
a first servo burst A having first servo burst edges offset from a centerline of a data track by a first fractional track pitch dimension;
a second servo burst B having second servo burst edges offset by a second fractional track pitch dimension from the first servo burst edges;
a third servo burst C having third servo burst edges offset by the first fractional track pitch dimension from the second servo burst edges; and
a fourth servo burst D having fourth servo burst edges offset by the second fractional track pitch dimension from the third servo burst edges,
the head position servo being responsive to the read element for determining head position by reading relative amplitudes of selected ones of the servo bursts.

15. The head position servo set forth in claim 14 including burst phase selection means for aiding determination of head position by selecting a pair of servo bursts comprising one of a plurality of available burst phases and by differencing relative amplitudes of the selected pair of servo bursts to obtain a position error signal.

16. The head position servo set forth in claim 15 further including a summing node for adding a predetermined fixed offset value to the position error signal depending upon burst phase in order to obtain a position error signal normalized over all burst phases.

17. The head position servo set forth in claim 14 wherein the read element is offset relative to the write element at certain radial positions, and further comprising a summing node for selectively adding a microjog value to the position error signal during one of reading and writing modes carried out by the disk drive.

18. The head position servo set forth in claim 15 wherein the burst phase selection means selects burst pairs in accordance with a decision tree.

19. The head position servo set forth in claim 15 wherein the burst phase selection means selects burst pairs in accordance with predetermined burst phase switch points fixed in relation to radial position of the read element relative to a track.

20. The head position servo set forth in claim 15 wherein the burst phase selection means selects between four available burst phases in obtaining the position error signal.

21. The head position servo set forth in claim 15 wherein the burst phase selection means selects between six available burst phases in obtaining the position error signal.

* * * * *